United States Patent [19]
Griffin, Jr.

[11] 4,236,313
[45] Dec. 2, 1980

[54] APPARATUS FOR AND METHOD OF EVALUATING SOLAR EXPOSURE

[76] Inventor: Roy N. Griffin, Jr., 466 Knoll Dr., Los Altos, Calif. 94022

[21] Appl. No.: 107,448

[22] Filed: Dec. 26, 1979

[51] Int. Cl.³ .............................................. G01C 1/00
[52] U.S. Cl. .................................. 33/1 DD; 33/1 SC; 33/268; 33/273; 33/274
[58] Field of Search .................. 33/1 R, 1 DD, 1 SE, 33/1 SD, 1 SA, 274, 268, 269, 270, 271, 272, 273

[56] References Cited

U.S. PATENT DOCUMENTS

| | | | |
|---|---|---|---|
| 1,615,507 | 1/1927 | Fisher | 33/274 |
| 2,478,315 | 8/1949 | Pollman | 33/1 DD |
| 2,677,183 | 5/1954 | Brenner | 33/274 |
| 3,090,124 | 5/1963 | Fruhling | 33/1 DD |
| 4,138,826 | 2/1979 | Inge | 3/268 |
| 4,177,566 | 12/1979 | Haines | 33/1 DD |

FOREIGN PATENT DOCUMENTS

| | | | |
|---|---|---|---|
| 216316 | 11/1909 | Fed. Rep. of Germany | 33/1 DD |
| 367123 | 2/1932 | United Kingdom | 33/1 DD |

OTHER PUBLICATIONS

Mother Earth News No. 152, Jul./Aug. 1978 "The Amazing $30 Solar Site Selector".

*Primary Examiner*—William D. Martin, Jr.
*Attorney, Agent, or Firm*—Flehr, Hohback, Test

[57] ABSTRACT

A technique is disclosed herein for evaluating solar exposure at various points in any one of a number of given geographic locations for any given period during the year in order to determine the most efficient location for a solar collector. This technique may be carried out utilizing a single apparatus which is also disclosed herein and which includes a solar pointing device and the necessary indicia to appropriately orient the pointing device with respect to its environment at the various points selected. Once the pointing device is oriented, it is moved in a solar pointing position in an way which determines the path of the sun between sunrise and sunset for each point. From these paths, the amount of actual solar exposure at each of the points selected can be determined taking into account any resulting obstructions such as trees, rooflines or the like.

12 Claims, 8 Drawing Figures

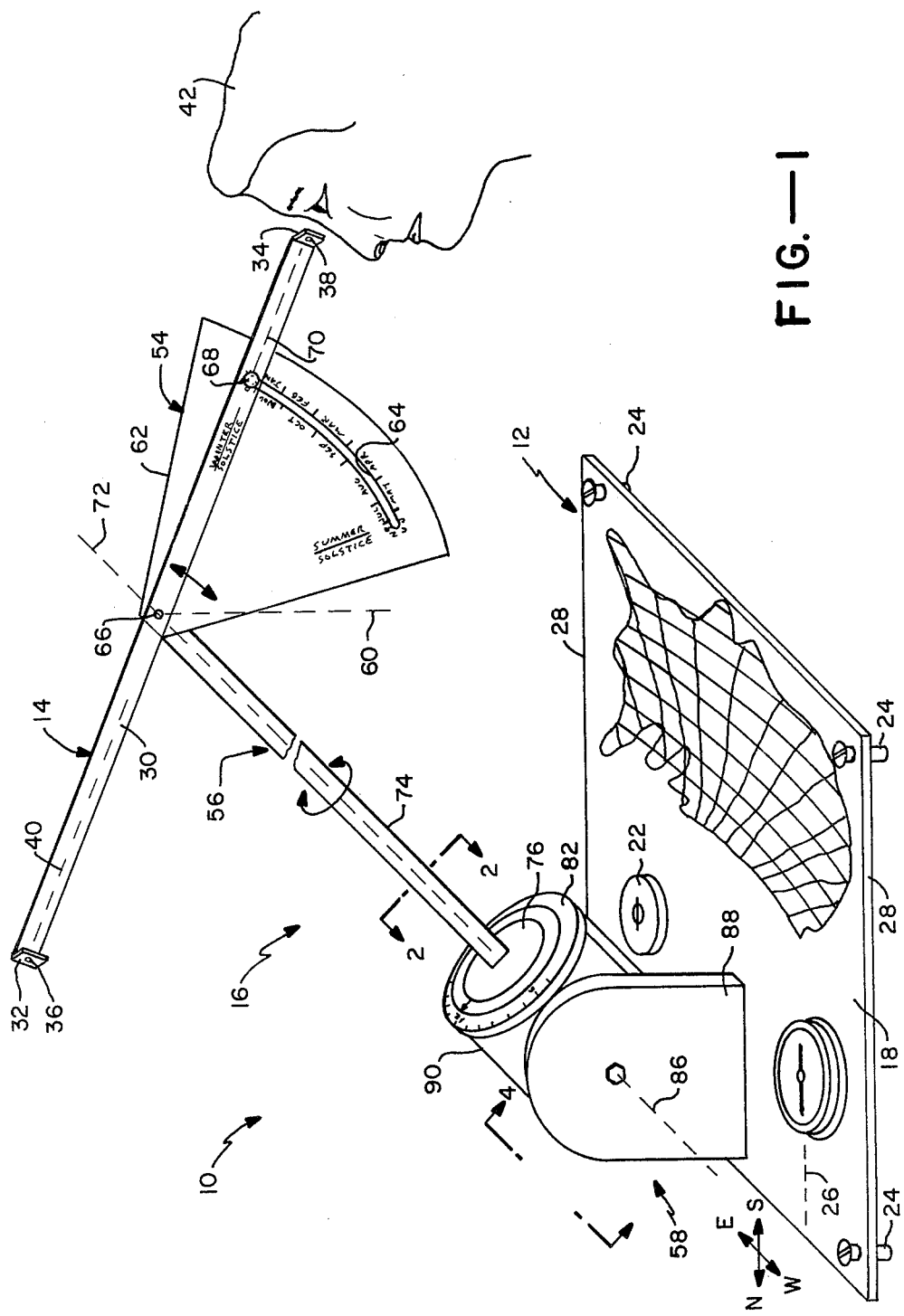
FIG.—1

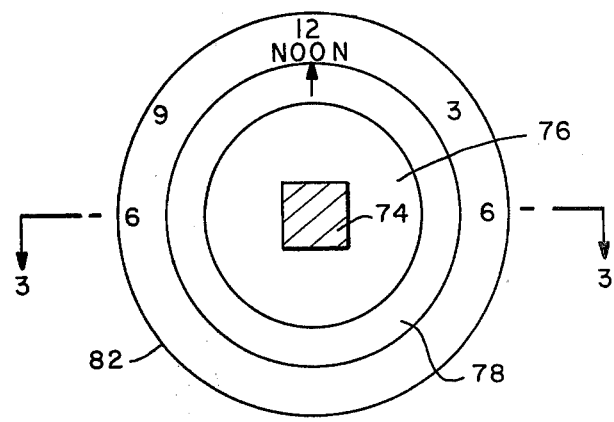
FIG.—2
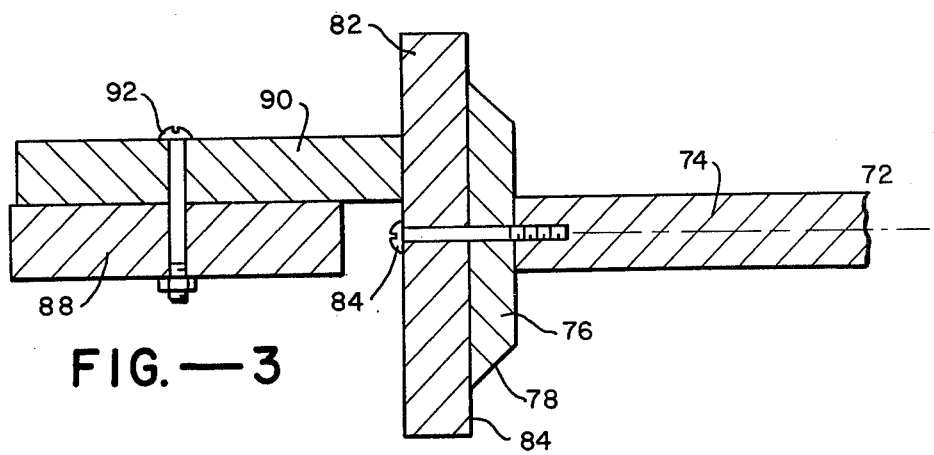
FIG.—3
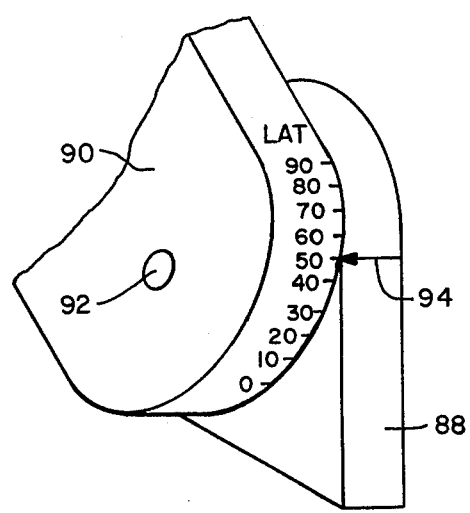
FIG.—4

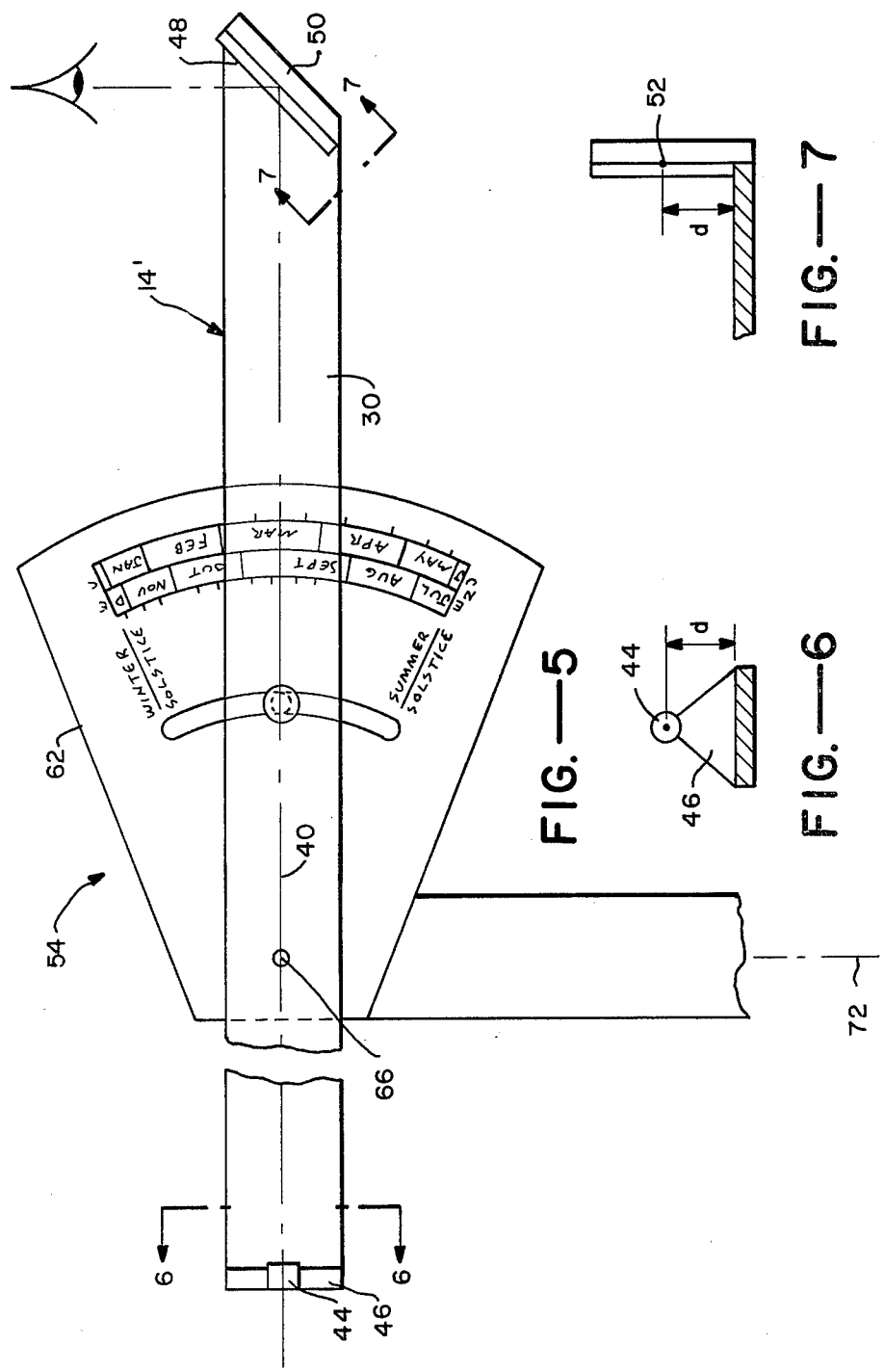

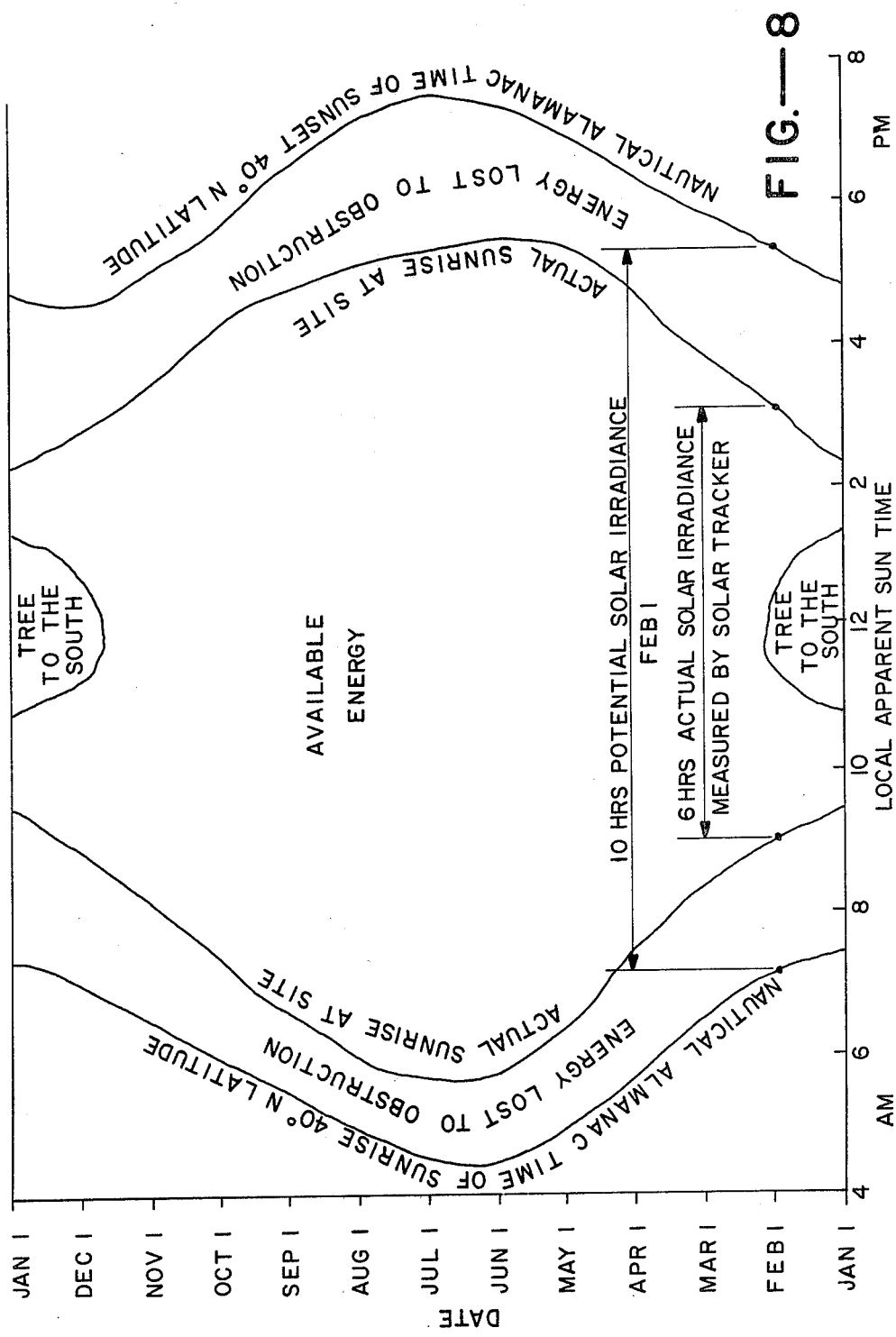

APPARATUS FOR AND METHOD OF EVALUATING SOLAR EXPOSURE

The present invention relates generally to a technique for determining the amount of direct solar exposure at a given point and more particularly to a method of and apparatus for evaluating solar exposure at various points in any geographical location for any given period during the year, whereby to determine the most efficient location for a solar collector.

In utilizing solar energy efficiently, it is important to select the most efficient or optimum location on a given site for placement of the solar energy devices, e.g., solar panels in order to maximize solar irradiance. Most residences and commercial buildings have other buildings, trees, hills or other objects nearby which shade much of the surrounding area during movement of the sun between sunrise and sunset. The actual amount of solar irradiance or exposure at a given point or area as compared to shade depends upon the particular geographic location and the time of the year. Thus, in order to find the best area to place a solar panel for maximizing exposure during a given reason requires knowing the position of the sun relative to a number of potential points or areas throughout the day during the particular season of interest. One way of doing this is to actually observe the position of the sun at the different locations during the season of interest. Although this is an accurate way of determining the best location, it is not practical since it requires going through an entire season before the location can be selected. Therefore, it is necessary to predict the position of the sun relative to the various locations in question either by using tables from the nautical almanac or other references or by utilizing a particular apparatus intended for this purpose. One such apparatus is disclosed in MOTHER EARTH NEWS, No. 52, dated July/August, 1978 on page 75. The apparatus disclosed there is said to consist of a semi-circular base plate with a built-in compass and leveling bubble, an attached, curved, transparent screen imprinted with solar-day-hour sun paths for the local latitude during the critical fall-winter-spring portion of the year and an attached 180° optical viewer. According to the article, this apparatus is operated by first setting the base plate on the site selected and using the compass to point it due south. The leveling bubble is used to make sure that the entire apparatus is level. Thereafter, the viewer is used in conjunction with the transparent screen which is superimposed on the trees, buildings and other obstructions in the background to see exactly where the sun will be during any hour from 8:00 a.m. to 4:00 p.m., from the autumn equinox (September 22) through the spring equinox (March 21).

Whether or not the apparatus just described is capable of accurately locating the sun, it is limited for use at a particular latitude within a relatively small latitude range, e.g., between 30N and 48N during a single season, specifically the winter months. This means that for the end user, for example, the homeowner, the apparatus must be made to order depending upon the user's location and the particular season of interest.

In view of the foregoing, one object of the present invention is to provide an uncomplicated, reliable and economical apparatus for use in determining the path taken by the sun from any given point regardless of the geographic location (within a large number of geographic locations, e.g., the Continental United States) and for any day of the year, thereby eliminating the necessity to "customize" the apparatus for the end user.

Another object of the present invention is to provide an apparatus especially suitable for evaluating solar exposure at various points in any given location for any given period during the year and a method of carrying out this evaluation.

Still another object of the present invention is to provide an apparatus for making the evaluation just referred to in any of a relatively large number of given geographic locations, for example, any location in the Continental United States, with no more than the apparatus itself and possibly a note pad or other means of recording the information obtained as a result of the apparatus.

As will be seen hereinafter, the apparatus disclosed herein is one which includes a base, an elongated solar pointing device adapted for placement in a pointing position with the sun and a support arrangement connected with the base and the pointing device. This support arrangement is designed in accordance with one aspect of the present invention to support the pointing device for movement in its solar pointing position between the extreme points of movement of the sun from sunrise to sunset and so long as (1) the base is maintained at a required orientation relative to its surroundings for the particular point selected and (2) the pointing device is maintained at a required latitude for the particular geographic location and a required declination corresponding to the particular time of the year selected, regardless of the point selected, the geographical location or the time of the year. Moreover, in the preferred embodiment, the apparatus contains indicia conveying all of the necessary information to provide the required orientation of the base at any given point selected, all of the necessary information as to the latitude in any given location within a relatively large group of locations and information as to the declination of the sun throughout the year, e.g., between winter solstice and summer solstice.

In using the apparatus just briefly described in evaluating solar exposure at various points within the given geographic location, the various points to evaluate are first selected, one at a time. At each of these points, the base of the apparatus is placed at the required latitude and declination, respectively corresponding to the geographic location and the time of year selected. While the latitude is of course fixed, the declination will depend upon the purpose of the evaluation in the first place. For example, if the evaluation is being made to position a solar panel for use in heating a swimming pool during the summer months, the only season of interest would be summer. On the other hand, if the purpose for the solar panels is to provide heat during the winter months, then the declination of the sun during the winter season would be of interest. If the solar panels are to be used to do both, then the evaluation should be made for the entire years. In any event, after the base is properly oriented for each point selected, and the pointing device has been placed at its required latitude and declination, the pointing device is moved in its solar pointing position between the extreme sunrise and sunset points, whereby to determine the path of the sun between these extreme points. From this path, the amount of actual solar exposure at the particular point being evaluated is determined taking into account shade resulting obstructions, such as trees, rooflines or the like.

The preferred technique utilized in evaluating solar exposure and the preferred apparatus utilized in carrying out this technique will be described in more detail hereinafter in conjunction with the drawings wherein:

FIG. 1 is a perspective view of an apparatus for use in evaluating solar exposure at various points in any of a number of given geographic location for any given period during the year, which apparatus is designed in accordance with the present invention;

FIG. 2 is the sectional view taken generally along line 2—2 in FIG. 1 and illustrating one particular design aspect of the apparatus of FIG. 1;

FIG. 3 is the sectional view taken generally along line 3—3 in FIG. 2 and illustrating another aspect of the apparatus of FIG. 1;

FIG. 4 is a view taken from line 4—4 in FIG. 1 illustrating still another aspect of the arrangement of FIG. 1;

FIG. 5 is a side view illustrating several different components making up the apparatus of FIG. 1 including a modification to one particular component of the apparatus illustrated in FIG. 1;

FIG. 6 is a sectional view taken along line 6—6 in FIG. 5; FIG. 7 is a sectional view taken generally along line 7—7 in FIG. 5; and FIG. 8 is a graphic illustration of a particular point which has been evaluated for solar exposure at a given latitude for periods throughout the year utilizing the apparatus illustrated in FIGS. 1 through 7.

Turning now to the drawings, wherein like components are designated by like reference numerals throughout the various figures, attention is first directed to FIG. 1 which illustrates an apparatus 10 designed in accordance with the present invention and utilized in evaluating solar exposure at any given geographic location for any given period during the year. As will be seen hereinafter, this particular apparatus may be the only tool necessary in making the evaluation, especially for large but limited geographic locations such as the Continental United States, regardless of the point selected within the given geographic location and regardless of the particular time of the year in which the evaluation is to be made. As will also be seen, in order to make these evaluations, apparatus 10 includes an overall support base 12, a solar pointing device 14 and an arrangement 16 connected with base 12 for supporting pointing device 14 in the manner to be described hereinafter.

Referring first to base 12, it can be seen from FIG. 1 that the latter is in the form of a sheet, panel or the like which is relatively rigid and which includes a top planar surface 18. This base contains a magnetic compass 20 and a bubble level 22 at its top surface as well as a plurality of leveling screws 24. The leveling screws serve to level the base and specifically planar surface 18 on the support surfaces selected, for example, the roof of a house. In this regard, it should be obvious that additional means such as blocks or the like may be necessary in supporting the base in a level position on a support surface which is not even remotely level such as a highly pitched roof.

In order to properly orient solar pointing device 14 relative to its surroundings utilizing arrangement 16, it must be first maintained in a fixed, required orientation relative to its surroundings for the particular point selected. In this regard, the base must not only be level as indicated above, but must be adjusted in azimuth to true north using the compass 20 to accomplish this. The compass itself, actually its north-south axis indicated by dotted lines at 26 is utilized as a frame of reference in making this adjustment. For purposes of convenience, axis 26 and the opposite sides of base 12, indicated to 28, are designed to be parallel to one another. Inasmuch as apparatus 10 is intended for use in a relatively large number of geographical locations, for example, throughout the entire Continental United States, its actual position in azimuth to true north will vary. Therefore, the apparatus contains indicia which convey the necessary information to adjust true north, e.g., compass variations for the various geographic locations. In the embodiment illustrated, a map of the Continental United States is displayed on planar surface 18 and includes this information. For reasons to become apparent hereinafter, this map also includes the latitude at the various geographic locations in the United States.

While all of the information on base 12 relating to compass variation and latitude is confined to the Continental United States, it is to be understood that apparatus 10 is not limited to use within the Continental United States. The base 12 could include indicia pertaining to other geographical areas in addition to or in lieu of the Continental United States. For example, the latitude and compass variation map of Canada and/or Mexico could be illustrated in conjunction with or in lieu of the map illustrated and/or maps of other countries of interest. In fact, an entire world map could be provided, although this would most likely be impractical from a size standpoint. Moreover, even if the user wishes to evaluate solar exposure at a particular point in a geographic location not present on the map illustrated, the apparatus can nevertheless be used once the user determines the particular latitude at that point and the compass variation. It is, however, desirable and preferred to have the appropriate map on the apparatus so that the latter is the only tool necessary in making the evaluation. Of course, a note pad or other means for recording the results of the evaluation would be desirable in any event.

Having described base 12, attention is now directed to solar pointing device 14 which is also best illustrated in FIG. 1. As seen there, the pointing device includes a straight section or body 30 which, for reasons to be discussed hereinafter, is preferably transparent. This straight section carries a front bracket 32 extending laterally from its front pointing end and a back bracket 34 extending laterally from its back viewing end. Bracket 32 contains a solar-alignment through-hole 36 and bracket 34 contains a viewing hole or peephole 38. These two holes are longitudinally aligned with one another so as to define a solar viewing or pointing axis indicated by dotted lines at 40. As will be seen hereinafter, pointing device 14 is maintained in a solar point position during operation of apparatus 10. In this position, the axis 40 is aimed towards the position of the sun at the winter solstice at the time of day and latitude of the individual using the apparatus, which individual is generally indicated at 42.

Referring to FIG. 5, a slightly modified solar pointing device is illustrated. This pointing device which is generally designated by the reference numeral 14' includes an identical straight section 30 having a front pointing end and a back viewing end. However, in this embodiment, the flange 32 including its associated through-hole 36 is replaced with a disc 44 which is preferably light opaque and which is supported laterally to one side of section 30, a distance d by a suitable support flange 46. At the same time, flange 34 including its peephole 38 is replaced with a mirror 48 which is forwardly and upwardly mounted at a 45° angle with the longitudinal axis of section 30 as shown in FIG. 5 and which is supported in this position by a suitable support flange 50. Mirror 48 also extends laterally to one side of section 30, a distance greater than d, as seen in FIG. 7. However, as also seen in FIG. 7, the mirror includes cross hairs generally indicated at 52 a distance d from section 30. The cross hairs and the disc 44 are aligned with one another to define previously described pointing axis 40. This modification is provided for the convenience of the observer in that he does not have to position himself directly behind the solar pointing device. In this latter regard, the disc is preferably sized to subtend the angle of the solar diameter at the earth's distance, e.g., about ½ degree.

Having described base 12 and solar pointing device 14 including modified device 14', attention is now directed to support arrangement 16 which is illustrated in FIG. 1 in conjunction with FIGS. 2, 3, 4 and 5. As will be seen hereinafter, arrangement 16 is provided for supporting pointing device 14 (or 14') for movement in its solar pointing position at any time during movement of the sun from sunrise to sunset and so long as the base is maintained at its required orientation, regardless of the point selected, the geographic location, or the time of the year. In order to accomplish this, arrangement 16 includes a season or declination adjusting mechanism 54, a time adjusting mechanism 56 and a latitude mechanism 58.

Referring to FIG. 1 in conjunction with FIG. 5, attention is first directed to season or declination adjusting mechanism 54. This mechanism serves to support solar pointing device for movement about an axis indicated by dotted lines at 60 in order to place the pointing device in an adjustably fixed, season related position relative to the axis, depending upon the time of the year selected. As seen in both FIGS. 1 and 5, mechanism 54 includes a sector plate 62 having indicia in the form of a curved analemma setting forth all of the months of the year between winter solstice and summer solstice. In a preferred embodiment, as illustrated best in FIG. 5, the analemma is subdivided into ten day intervals. The sector plate also includes a similarly curved slot 64 adjacent to and extending the entire length of the analemma along the rearward, larger back end of the plate. The front end of the plate supports solar printing device 14 at an intermediate point on the latter for pivotal movement about the previously described axis 60. Suitable pivot supporting means generally indicated at 66 is provided for this purpose. In order to aid in this pivotal movement, mechanism 54 includes a locking pin 68 or other suitable means (for example, a locking screw and nut) fixedly connected with the solar pointing device for movement in slot 64 and capable of locking the device in a fixed position related to the slot. An indexing mark 70 is provided on the straight section 30 of the solar pointing device and in lateral alignment with axis 40 so as to indicate the position of the solar pointing device with respect to the analemma. In this regard, the reason that straight section 30 of the pointing device is preferably transparent is so that the portion of the analemma located behind section 30 can be readily viewed.

As stated above, mechanism 54 serves to support pointing device 14 (or 14') in an adjustably fixed season related position, that is, at the appropriate declination of the sun at the selected time of the year. It is to be understood, however, that for this adjustment to be a true reflection of the position of the sun during the period selected, base 12 must be placed in its required orientation, latitude adjusting mechanism 58 must be appropriately adjusted for latitude, and time adjusting mechanism 56 must be positioned in the manner to be described. In other words, all of these mechanisms and base 12 are interdependent to one another for providing the appropriate orientation for the solar pointing device.

Referring now to time adjusting mechanism 56, attention is directed to FIG. 1 in conjunction with FIGS. 2 and 3. As will be seen hereinafter, this latter mechanism serves to support solar pointing device 14 (or 14') and the season or declination adjusting mechanism 54 for movement about a second, polar axis 72. When all adjustments are made, this axis points upward toward the celestial pole in order to place the pointing device in an adjustably fixed, time related position relative to the second axis, depending upon the time of day between sunrise and sunset. As seen best in FIG. 5, axis 72 is normal to axis 60 (extending out of the paper) and, as shown clearly, axis 72 and the axis 40 defined by the solar pointing device, are in approximately the same plane.

In order to carry out its time adjusting function, mechanism 56 includes a straight member 74 which defines polar axis 72 and which has an upper end connected with and supporting the front end of sector plate 62 at pivot point 66, whereby to allow the solar pointing device to pivot about axis 60. The same pivot connecting means 66 referred to above may be utilized for making this connection. The bottom end of member 74 includes an enlarged disc shaped, index bearing member 76, fixedly connected thereto. As seen in FIGS. 2 and 3, this disc-shaped member includes a forward facing beveled periphery 78 carrying an index mark 80 for purposes to be discussed below. The disc-shaped member forms part of time adjusting mechanism 56 along with straight member 74 and a disc-shaped member 82 which is fixedly supported relative to members 74 and 76 by latitude adjusting mechanism 58 in a manner to be described hereinafter. As best seen in FIGS. 2 and 3, member 76 is concentrically positioned against the front face 84 of member 82 and is mounted to fixed member 82 for rotation about axis 72 by suitable means such as the pivot pin 84 which extends through the two adjacent disc-shaped members as best seen in FIG. 3. In this way, straight member 74, mechanism 54 and the solar pointing device pivot with member 76 about axis 72.

Referring specifically to FIGS. 2 and 3, it can be seen that the face 84 of fixed disc-shaped member 82 surrounds beveled periphery 78 of disc-shaped member 76. The exposed peripheral section of surface 84 includes indicia around a portion of its circumference setting forth all of the hours of the day between sunrise and sunset, e.g., between 4:00 a.m. and 8:00 p.m., preferably scaled into ten minute intervals. This time scale and the indexing mark 80 cooperate with one another in order to place the solar pointing device in a time related position between sunrise and sunset.

Referring to FIG. 1 in conjunction with FIGS. 3 and 4, attention is directed to latitude adjusting mechanism 58. As will be seen, this mechanism serves to support the solar pointing device 14, the season adjusting mechanism 54 and the time adjusting mechanism 56 for movement about a third or latitude axis indicated by dotted lines at 86 in order to place the pointing device in an adjustably fixed, latitude related position relative to the third axis. As best seen in FIG. 1, latitude axis 86 is normal to the north-south axis 26 of compass 20 and is therefore also normal to sides 28 of base 12. It is also normal to axis 72.

The structural components marking up mechanism 58 include a first support plate 88 fixedly connected with and extending up from the planar surface 18 of base 12. A second support plate 90 is fixedly located to and extends rearwardly from previously described disc-shaped member 82 comprising part of mechanism 56, as best seen in FIG. 3. Support plate 90 is mounted to support plate 88 for pivotal movement about axis 86 by suitable means such as pivot pin 92, also best seen in FIG. 3. In this way, the solar pointing device and mechanisms 54 and 56 are also supported for movement about axis 86.

As seen best in FIG. 4, the rearward edge of movaeable support plate 90 includes indicia setting forth latitude and the back edge of fixed support edge 88 includes an indexing mark 94 cooperating with the latitude indicia in order to place the pointing device at the appropriate latitude depending upon the selected geographic location.

The apparatus just described is especially suitable for evaluating solar exposure at various points in a given geographic location for any given period during the year. In this way, the optimum location for a solar panel can be determined based on its intended use. In order to make this evaluation, the various points are selected, one at a time. At each of these selected points, the base is placed at its required orientation, that is, the axis 26 is aligned with true north using compass 20 and the appropriate compass variation obtained from the map on planar surface 18 and the planar surface is leveled using leveling screws 24 and other means, if necessary, and bubble level 22. At the same time, the appropriate latitude is read off of the map or otherwise obtained and the mechanism 58 is adjusted to that latitude. In addition, mechanism 54 is adjusted to reflect the appropriate declination for the period of the year being evaluated. Thereafter, at each of the points, the solar pointing device is moved in its solar pointing position, that is, at an aimed position towards the sun, between the extreme sunrise and sunset points, whereby to determine the path of the sun between these extreme points. From this path the amount of actual solar exposure at the point under evaluation is determined taking into account shade resulting obstructions such as trees, rooflines or the like. In a preferred evaluating approach, the reading is taken at a plurality of different declination settings corresponding to the seasons of interest.

In the evaluating technique described above utilizing apparatus 10, it may be desirable and in some cases important to graphically illustrate the results obtained. An example of such a graphical analysis is illustrated in FIG. 8 in which the horizontal axis represents local apparent sun time between 4:00 a.m. and 8:00 p.m. and the vertical axis represents each month throughout a single year. The example illustrated is for a given point in a location 40° N. latitude and the evaluation has been provided for a full year. The graph not only illustrates the results obtained, but also the theoretical nautical almanac time of sunrise at 40° N. latitude, the theoretical nautical almanac time of sunset at 40° N. latitude and the various shade resulting obstructions to solar exposure at the selected point. From the geographical analysis, it should be apparent that actual sunrise is later than the theoretical sunrise at all times during the year and actual sunset is earlier than theoretical sunset at all times during the year as a result of obstructions. It should also be noted that a tree provides a shade resulting obstruction between approximately 11:00 a.m. and 1:00 p.m. for the months of December, January and February.

Based on the graphical results in FIG. 8, it should be apparent that there is a relatively small amount of exposure to the sun at the selected point during the winter months, while there is a relatively large amount of exposure during the summer months. Therefore, if the purpose for the evaluation is to locate a solar panel intended to provide solar energy for heat during the winter, the point selected does not appear to be very promising. On the other hand, if the purpose is to locate a panel used to heat a swimming pool during the summer months, the point selected may well be an optimum point. However, in order to make any absolute determination, it may be necessary to evaluate other points and provide similar graphical analyses.

I claim:

1. An apparatus for use in determining the amount of direct solar exposure at a particular point between sunrise and sunset for different points in any one of a number of different geographic locations, for any day of the year, said apparatus comprising:
   (a) a support base including means for maintaining the base at a required fixed orientation relative to its surroundings for the particular point selected;
   (b) means including indicia contained on and displayed by said support base for conveying the necessary information to provide said specific orientation;
   (c) an elongated solar pointing device adapted for placement in a pointing position with the sun; and
   (d) an arrangement connected with said base for supporting said pointing device for movement in its solar pointing position at any time during movement of the sun from sunrise to sunset and so long as said base is maintained at its required orientation regardless of the point selected, the geographic location or the time of the year, whereby to determine the path taken by the sun during said movement and therefore the amount of direct solar exposure of the point selected, said arrangement including
      (i) first, season adjusting means supporting said solar pointing device for movement about a first axis in order to place said device in an adjustably fixed, season related position relative to said axis depending upon the day of year, said season adjusting means including indicia setting forth the months of the year and an indexing mark in order to place the pointing device in the desired season related position,
      (ii) second, time adjusting means supporting said solar pointing device and said season adjusting means for movement about a second axis in order to place said device in an adjustably fixed, time related position relative to said second axis, depending on the time of day between sunrise and sunset, said time adjusting means including indicia setting forth the different hours of the day between sunrise and sunset and an indexing mark in order to place the pointing device in the desired time related position, and
      (iii) third, latitude adjusting means supporting said solar pointing device, said season adjusting means and said time adjusting means for movement about a third axis in order to place said device in an adjustably fixed, latitude related position relative to said third axis depending upon the latitude of the geographic location of the selected point, said latitude adjusting means including indicia setting forth latitude and an indexing mark in order to place the pointing device at the appropriate latitude and indicia contained on and displayed by said base for conveying the necessary information to provide the appropriate latitude.

2. An apparatus according to claim 1 wherein said base includes a planar surface and adjustable legs serving at least in part as said orientation maintaining means, wherein said information conveying means contained on said base includes a level indicating device and compass on said planar surface and wherein the information conveyed by the first-mentioned indicia includes required compass variations at different geographical locations.

3. An apparatus according to claim 1 wherein the indicia for conveying latitude information includes a map of the Continental United Stages showing latitude.

4. An apparatus according to claim 1 wherein said solar pointing device includes a straight section which defines a straight viewing axis and which has a front pointing end and a back viewing end, said device also including a light blocking sighting disc mounted to the front end of said straight section and located on said viewing axis, and means including a mirrored surface mounted to the back end of said straight sectin at an angle with said axis for providing a view towards said disc along said axis from an observation point at an angle with said axis.

5. An apparatus according to claim 1 wherein said season adjusting means includes a sector plate and the indicia included by said season adjusting means includes an analemma, said sector place including a similarly shaped slot adjacent to said analemma, and wherein said solar pointing device is pivotally connected at one point along its length to said sector plate and interlocked at another point along its length with said plate for movement along said slot, said pointing device carrying the indexing mark included by said season adjusting means.

6. An apparatus according to claim 5 wherein said time adjusting means includes a straight member which defines said second axis and which has an upper end pivotally connected with said solar pointing device at said one point and a bottom end, said time adjusting means also including disc-shaped means fixedly connected to the bottom end of said straight member and means connecting said disc-shaped means to said latitude adjusting means for rotating said straight member about said second axis, the indicia included by said time adjusting means including an hour scale extending around a portion of the outer periphery of said disc-shaped means on said latitude adjusting means and the indexing mark included by said latitude adjusting means being contained on said disc-shaped means.

7. An apparatus according to claim 6 wherein said latitude adjusting means includes a first support plate fixedly connected with said base and a second support plate which is mounted to said first plate for movement about said third axis and which supports said disc-shaped means and straight member for rotation about said second axis, the indicia setting forth latitude being contained on said first support plate and its associated indexing mark being located on said second plate.

8. An apparatus according to claim 7 wherein said base includes a planar surface, and adjustably positionable legs at least in part serving as said orientation maintaining means, wherein said information conveying means includes a level indicating device and compass on said planar surface, wherein the information conveyed by the first-mentioned indicia includes required compass variations at different latitudes, and wherein the indicia for conveying latitude information includes a map of the Continental United States showing latitude.

9. An apparatus according to claim 8 wherein said solar pointing device includes a straight section which defines a straight viewing axis, and which has a front pointing end and a back viewing end, said device also including a light blocking sighting disc mounted to the front end of said straight section and located on said viewing axis, and means including a mirrored surface mounted to the back end of said straight section at an angle with said axis for providing a view towards said disc along said axis from an observation point at an angle with said axis.

10. A method of evaluating solar exposure at various points in any of a number of given geographic locations for any given period during the year, said method comprising:
  (a) providing an apparatus including a support base, an elongated solar pointing device adapted for placement in a pointing position with the sun, and an arrangement connected with said base for supporting said pointing device for movement in its solar pointing position between the extreme points of movement of the sun from sunrise to sunset and so long as said base is maintained at a required orientation relative to its surroundings for the particular point selected and the pointing device is maintained at a required latitude for the particular geographic location and a required declination corresponding to the particular time of year selected, regardless of the point selected, the geographical location or the time of the year, whereby to move said device in its solar pointing position along the path taken by the sun during said movement, said apparatus containing indicia conveying information to provide the required orientation of said base at any of said points, information as to the latitude at any of said geographic locations and information as to the declination of the sun from the selected point at any time durnng the year;
  (b) selecting said various points, one at a time;
  (c) at each of said selected points, placing said base at the required orientation for the particular point selected and placing said pointing device at the required latitude and declination respectively corresponding to the geographic location and the time of the year selected; and
  (d) thereafter, at each of said points, moving said solar pointing device in its solar pointing position between said extreme sunrise and sunset points whereby to determine the path of the sun between said extreme points for each selected point and from said path the amount of actual solar exposure to said points taking into account shade resulting obstructions such as trees, rooflines or the like.

11. A method according to claim 10 wherein for each of said points selected said pointing device is placed at a plurality of different declinations corresponding to different times of the year and said device is moved in its solar pointing position between said extreme points for each of said different declinations.

12. A method according to claim 11 including the step of graphically displaying the path taken by said sun between sunrise and sunset at each of said points at each of said declinations.

* * * * *